US009772968B2

(12) United States Patent
Kanigicherla et al.

(10) Patent No.: US 9,772,968 B2
(45) Date of Patent: Sep. 26, 2017

(54) NETWORK INTERFACE SHARING

(71) Applicant: INEDA SYSTEMS INC., Santa Clara, CA (US)

(72) Inventors: Balaji Kanigicherla, Andhra Pradesh (IN); Krishna Mohan Tandaboina, Andhra Pradesh (IN); Murali Desiraju, Andhra Pradesh (IN); Sitaram Banda, Andhra Pradesh (IN); Hari Prasad Koluguri, Andhra Pradesh (IN); Satyababu Madderu, Andhra Pradesh (IN); Siva Kumar Gowrisetti, Andhra Pradesh (IN)

(73) Assignee: Ineda Systems Inc., Santa Clara, CA (US)

( * ) Notice: Subject to any disclaimer, the term of this patent is extended or adjusted under 35 U.S.C. 154(b) by 538 days.

(21) Appl. No.: 14/285,578

(22) Filed: May 22, 2014

(65) Prior Publication Data
US 2015/0178235 A1 Jun. 25, 2015

(30) Foreign Application Priority Data
Dec. 23, 2013 (IN) .......................... 5983/CHE/2013

(51) Int. Cl.
*G06F 13/24* (2006.01)
*G06F 13/40* (2006.01)
*G06F 13/26* (2006.01)
*H04L 12/24* (2006.01)
*H04L 12/947* (2013.01)

(52) U.S. Cl.
CPC .......... *G06F 13/4027* (2013.01); *G06F 13/24* (2013.01); *G06F 13/26* (2013.01); *H04L 41/0803* (2013.01); *H04L 49/251* (2013.01); *Y02B 60/1228* (2013.01); *Y02B 60/1235* (2013.01)

(58) Field of Classification Search
USPC ................ 710/260-269, 201-202, 218-225
See application file for complete search history.

(56) References Cited

U.S. PATENT DOCUMENTS 6,854,115 B1 * 2/2005 Traversat .............. G06F 11/203
711/113
6,941,410 B1 * 9/2005 Traversat .............. G06F 9/4435
711/103

(Continued)

*Primary Examiner* — Raymond Phan
(74) *Attorney, Agent, or Firm* — Workman Nydegger

(57) ABSTRACT

Systems and methods to share a plurality of virtual network interface controllers (vNICs) amongst a plurality of hosts 104 are described. The described methods are implemented in a network sharing system (NISS) (102) including a programmable vNIC cluster (204) comprising the plurality of vNICs, where a set of vNICs from amongst the plurality of vNICs is dynamically configured to communicate with a host (104-1) from amongst the plurality of hosts (104). Further, the NISS (102) includes a multi-host peripheral component interconnect (PCI) express (PCIe) interface and mapper (MHIP) (202) coupled to the programmable vNIC cluster (204), to receive data packets from the set of vNICs, wherein the set of vNICs comprises one or more vNICs; and provide the data packets from the set of vNICs to the host (104-1) based on demultiplexing of the data packets.

21 Claims, 6 Drawing Sheets

(56) References Cited

U.S. PATENT DOCUMENTS

| | | | | |
|---|---|---|---|---|
| 7,245,627 B2* | 7/2007 | Goldenberg | ............ | H04L 47/10 370/419 |
| 7,415,034 B2* | 8/2008 | Muller | ................. | G06F 9/5077 370/463 |
| 7,454,756 B2* | 11/2008 | Lantz | ................. | G06F 9/45558 718/1 |
| 7,912,082 B2* | 3/2011 | Yang | ....................... | H04L 49/90 370/463 |
| 8,195,774 B2* | 6/2012 | Lambeth | ........... | H04L 29/12839 709/220 |
| 8,739,177 B2* | 5/2014 | Qian | ................... | H04L 49/9057 718/1 |
| 9,077,659 B2* | 7/2015 | Armstrong | .............. | H04L 45/44 |
| 9,280,504 B2* | 3/2016 | Ben-Michael | ........ | G06F 13/385 |
| 2003/0200315 A1* | 10/2003 | Goldenberg | ............ | H04L 47/10 709/225 |
| 2006/0294517 A1* | 12/2006 | Zimmer | ............. | H04L 67/1002 718/1 |
| 2007/0233825 A1* | 10/2007 | Brownell | .......... | H04L 29/12009 709/220 |
| 2008/0002683 A1* | 1/2008 | Droux | .................. | H04L 45/586 370/389 |
| 2008/0270599 A1* | 10/2008 | Tamir | ................. | H04L 41/0803 709/224 |

\* cited by examiner

NETWORK INTERFACE SHARING

CROSS-REFERENCE TO RELATED APPLICATIONS

This application claims priority to and the benefit of Indian Patent Application Serial No. 5983/CHE/2013, filed on Dec. 23, 2013, entitled "NETWORK INTERFACE SHARING", which is incorporated herein in its entirety.

TECHNICAL FIELD

The present subject matter relates, in general, to a multi-host computing environment and, in particular, to sharing of a network interface among a plurality of hosts of the multi-host computing environment.

BACKGROUND

Computer networks necessitate the provision of various communication protocols to transmit and receive data. Typically, a computer network comprises a plurality of devices, such as computers, printers, and other computer peripherals, communicatively connected together. Data is transferred between each of the devices as data packets or frames which are communicated through the network using a communication protocol standard. Examples of the communication protocol standards include Internet Protocol (IP), Point-to-Point Protocol (PPP), and Transmission Control Protocol (TCP). Each network device includes a combination of hardware and software that translates protocols and process data. For example, a Network Interface Controller (NIC) connects a computer to a communication network.

To connect several devices to the communication network, a network interface controller (NIC) is generally coupled to each of the device and is also connected to network switching equipments at various layers. The network switching equipments typically includes network devices that forward traffic between devices based on information available at the Logic Link Layer, such as the MAC layer address in Ethernet, Token Ring, Fiber Channel or other types of packet switched network segments.

Conventionally, the NIC connected to the device provides network connectivity based on standard communication protocol along with various performance features like Tx/Rx Offload, Checksum offloads, address filtering, VLAN filtering etc. In the Ethernet protocol, a media access control (MAC) layer of the NIC acts as an interface between a Logic Link Layer, Layer 2 of the OSI reference model, and Physical Layer. The MAC layer, thus, transforms data packets from the host processor (also referred to as host herein) and sends the data packets to the physical layer, typically using Media Independent Interfaces, which serialize the data and transmits on the communication network.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
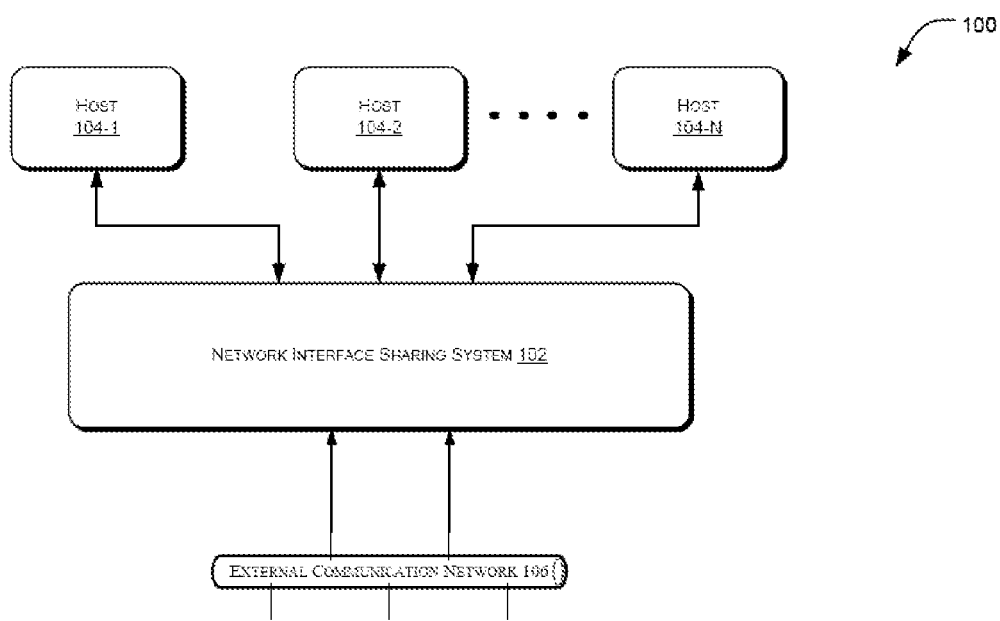
FIG. 1 illustrates a multi-host networking environment implementing a network interface sharing system (NISS), according to an implementation of the present subject matter.

Systems and methods to share network interface controllers (NICs) amongst a plurality of hosts in a multi-host networking environment are described herein. A multi-host networking environment can be understood as a computing environment where multiple hosts, either implemented in a device, or implemented individually, share a common communication network through various networking entities, such as NICs, Layer 2 (L2) network switches, gateways, and routers. For the sake of explanation, the description henceforth is limited to Ethernet standards of communication and use of Ethernet L2 switches for the purpose of data transfer. Although the description herein is for Ethernet standards of communication and Local Area Networks (LAN), the described systems and methods may also be implemented in various other communication protocols and communication networks to share network controllers amongst the plurality of hosts, albeit a few variations which will be apparent to those skilled in the art.

In recent years, deployment of modern communication networks such as LAN has become widespread in business organizations and educational enterprises to interconnect computing devices. These modern communication networks have provided significant productivity gains, not only by providing the computing devices with the ability to electronically communicate with one another, but also by enabling shared access of databases and documents stored on a central server and on the networked workstations.

To provide computing capabilities and connect to communication networks, a typical computing device consists of several components including a host processor or the central processing unit, a high performance bus based interconnect such as peripheral connect interface (PCI) express (PCIe), and several IO controllers to interface networking, graphics, etc. However these IO controller resources are dedicated to a single host processor and are generally not shared amongst multiple hosts.

To connect to the modern networks, such as LAN, each computing device includes a dedicated network interface controller (NIC) as the IO controller. While computing devices utilize the NICs connected to them, there are situations when either there is a requirement of increased and enhanced networking capabilities which the connected NICs are incapable of providing or, the dedicated NIC are idle and not optimally utilized.

In situations of requirement of increased or enhanced networking capabilities such as better communication speed or additional bandwidth, either additional NICs are to be installed or older NICs are to be replaced with new NICs to provide the required capabilities. Further, since the NICs connected to each host are dedicated, in situations when enhanced networking capabilities are required, idle NICs of other hosts can also be not shared.

Many new computing devices available today are being made smaller, compact, and lighter to optimize space and cost. To achieve such compact and light weight computing devices, manufacturers generally do not provide expansion slots in the computing systems to add new hardware components, such as additional NICs. Since installation of additional NICs in such computing devices is not possible, fulfillment of additional requirements is to be met by replacement of old NICs with new NICs which provide the required additional capabilities.

Further, to reduce power consumption and enhance overall performance, manufacturers of some of the computing devices also provide integrated IO controllers which are difficult to replace. Further, many of the requirements of enhanced networking capabilities are short term for which temporary replacement of the existing NICs is inefficient in terms of cost and time. Hence, providing computing devises with additional capabilities from time to time by either installation of additional or new NICs, in today's available computing devices is a challenging task.

To this end, according to the present subject matter, systems and methods to share multiple NICs amongst a plurality of hosts in a multi-host networking environment is described herein. The described systems allow multiple hosts to share a cluster of NICs which may communicate with one or more hosts based on the requirements of the multi-host computing environment. Since the described systems also allow dynamic configurability of NICs, NICs would not have to be integrated with the hosts and, additional requirements of hosts from time to time can be fulfilled by sharing the available NICs from the cluster of NICs.

Further, the described system also implements an embedded enhanced L2 switch for routing of data packets between the cluster of NICs and a MAC cluster such that requirement of a top of the rack L2 switch is obviated and the sharing of the multiple NICs amongst the plurality of hosts is handled efficiently. Furthermore, in one implementation, the described systems also allow direct host to host communications such that external communication networks like LAN are not utilized for such communications.

In one implementation of the present subject matter, a network interface sharing system (NISS) is described. The NISS, amongst other components, may include a programmable virtual NIC (vNIC) cluster, an integrated enhanced L2 switch, a cluster of MAC, a multi-host interface and mapper (MHIP), a control plane CPU, and a shared memory management unit to share networking interface, such as the NIC amongst the plurality of hosts. For the sake of explanation, the virtual programmable NICs are referred to as vNICs hereinafter.

In one implementation, the vNIC cluster includes multiple vNICs which can be configured to provide different functionalities, such as provide different bandwidths, utilize different priorities for different packets, and operate at different speeds of communication. In said implementation, the NISS may formulate multiple sets of vNICs such that each set of vNIC may communicate with a host. In one implementation, each set of vNIC may include one or more vNICs. The configuration of each set of vNICs, such as the number if vNIC included, and the functionalities supported by the set may be configured by the NISS. The NISS may thereafter configure each set of vNICs to communicate with one host from amongst the multiple hosts. Thus, in other words, each host may utilize one set of vNICs and communicate with the vNICs included in the set.

Further, the NISS may also dynamically modify the set of vNICs by either modifying the capabilities of the set or, by modifying the number of vNICs included in the set. In other words, either the configuration of operation, or the configuration of structure may be modified by the NISS.

For example, if a set of 5 vNICs has been formed where each vNIC is configured to operate at 1 Gigahertz (1 G) to communicate with a host, the NISS may modify the set of vNICs by either configuring the 5NICs to operate at 10 G or by increasing or decreasing the number of vNICs in the set. In one case, the set may be changed to now include 3 vNICs operating at 10 G, while in another, the set may include 6 vNICs operating at 10 G. In one implementation, any modification to the set of vNICs may be done by the NISS based on the different requirements of each host at different time instances. Further, such requirements of each host may be available with the NISS through the various parameters. Similar to the above example, it would be appreciated that the set of vNICs may merely include a single vNIC which may be configured by the NISS based on the requirement of the host to communicate between the host and the external communication network.

In one implementation, for the purpose of facilitating communication between multiple hosts and the vNICs, the MHIP may provide mapping and interfacing capabilities. The MHIP may allow the hosts to communicate with multiple vNICs included in a set through the MHIP without being dedicatedly coupled to any particular vNIC. The MHIP may utilize multiplexing and demultiplexing techniques to provide data packets from multiple hosts to one vNIC and from multiple vNICs to one host. It would be understood that the interface provided by the MHIP may be based on the communication protocol supported by the hosts and vNICS, such as the PCIe. However, in situations where hosts or the vNICs communicate in different protocols, the MHIP may also do the necessary conversion to facilitate communication.

In another implementation, the enhanced L2 switch may provide efficient forwarding or switching capabilities and enhanced speed of communication between the hosts and the external communication network. In said implementation, the enhanced L2 switch may include one or more port switches which interface the programmable vNIC cluster and line interfaces connecting to the external communication network through the cluster of MAC. Also, the one or more port switches may share the common memory management unit for the purpose of storage of packet data and allow forwarding of header corresponding to the data packets and allows for enhanced speed of communication between the hosts and the external communication network.

Further, the enhanced L2 switch may also include common offload engines to provide checksum capabilities to the data being communicated between the hosts and external communication network. The common offload engines may be implemented to the line interface such that offload engines for each host are not required, enabling the enhanced L2 switch to be implemented with optimized number of offload engines in lesser area and with lesser power consumption.

In one implementation, the cluster of MAC included in the NISS provides an interface between the enhanced L2 switch and the external communication network. The cluster of MAC may include one or more MAC cores which implement media access control logic and reconciliation sub-layer logic while operating at different speed of communication, such as 1 G and 10 G. The one or more MAC cores included in the cluster of MAC may be shared by the plurality of hosts for the purpose of communication with the external communication network. It would be understood that the cluster of MAC includes various different components, such as EMAC controllers, Serial Gigabit Media Independent Interface (SGMII) and XGMII extended sub-layer (XGXS) interfaces for the purpose of providing media access control to the communication between the hosts and the external communication network.

Hence, the NISS may allow sharing of programmable vNICs amongst the multiple hosts which may provide additional on-the-go increased capabilities to the hosts without any physical change of the hardware components. Further, the implementation of enhanced L2 switch facilitates enhanced speed of communication with lesser area of implementation and lower power consumption.

Figure 2A:
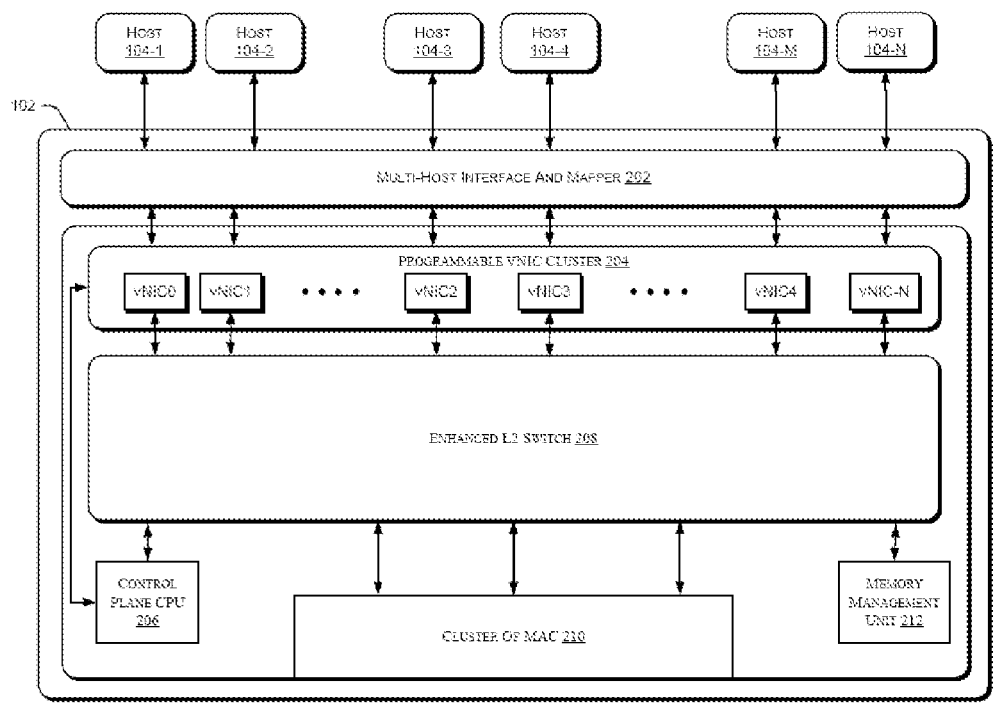
FIG. 2(a) illustrates a schematic representation of the NISS 102, in accordance with an implementation of the present subject matter.
Figure 2B:
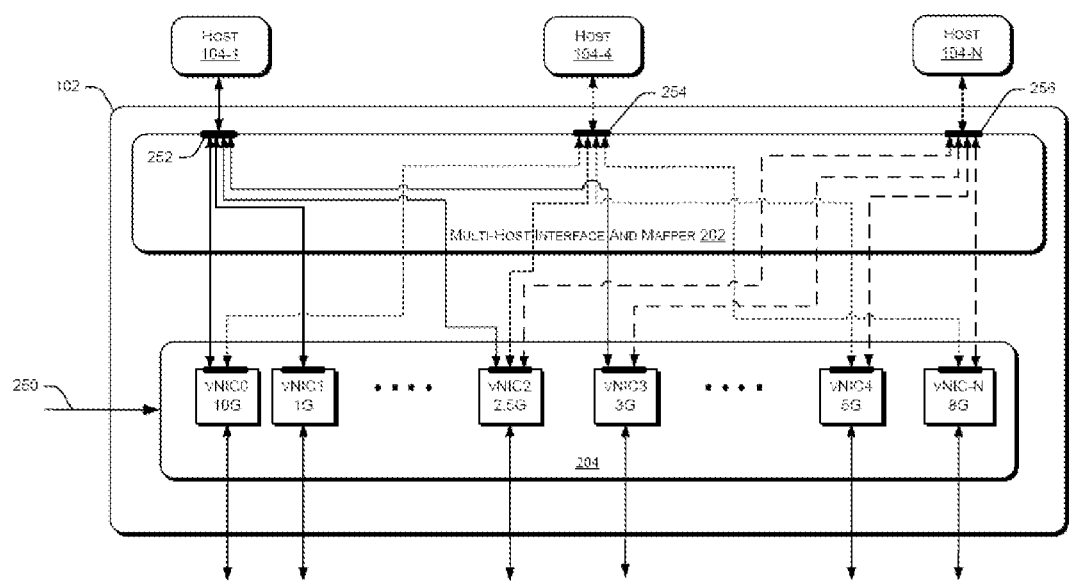
FIG. 2(b) illustrates a schematic representation of virtual hierarchy traffic stream maintained by the NISS, in accordance with an implementation of the present subject matter.
Figure 2C:
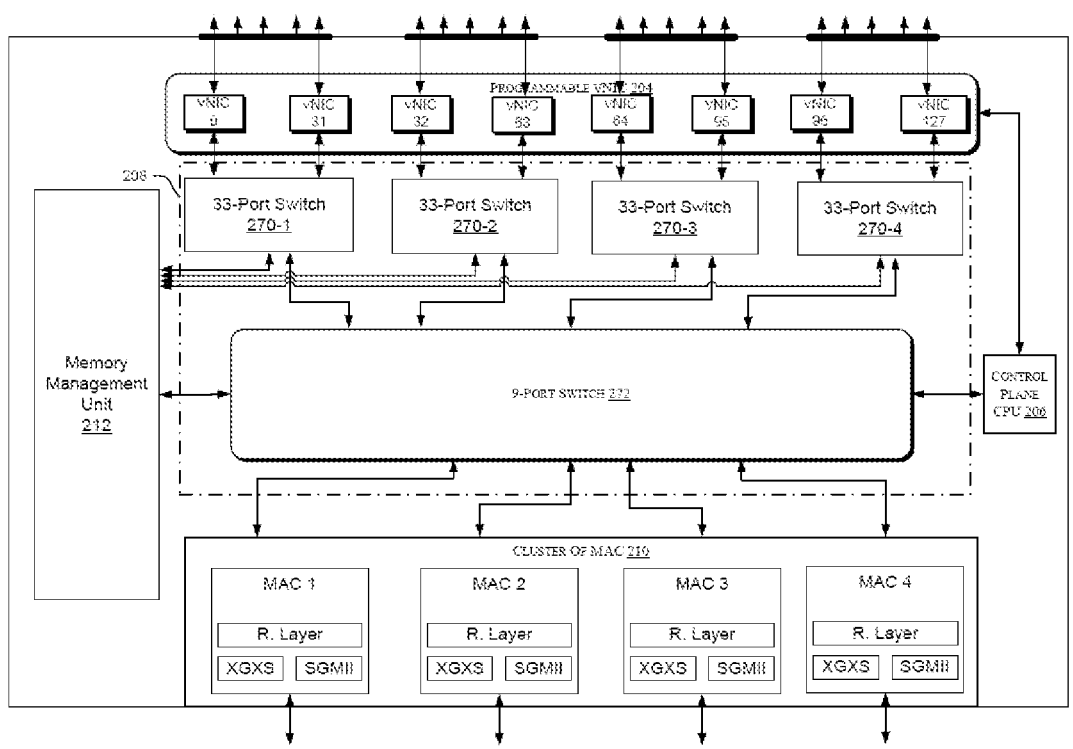
FIG. 2(c) illustrates the NISS 102, implementing an enhanced L2 switch, in accordance with an implementation of the present subject matter.
Figure 3A:
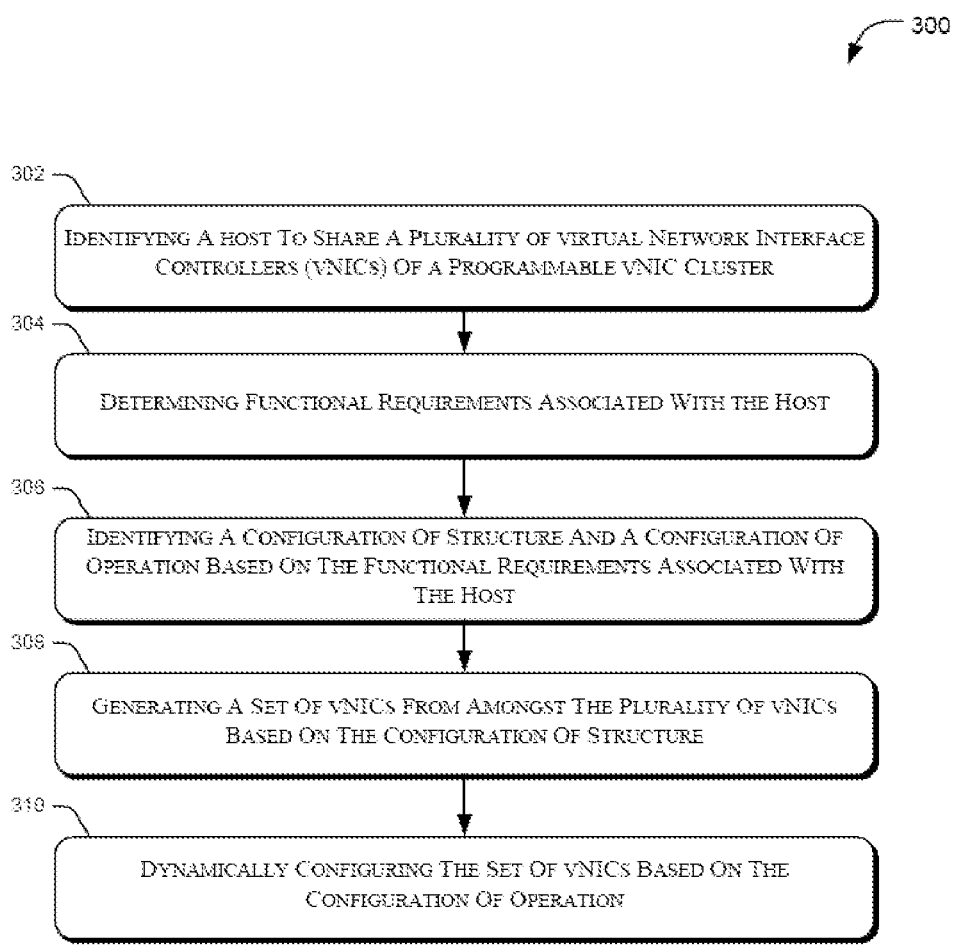
FIG. 3(a) illustrates a method of sharing network interface controllers (NICs) amongst a plurality of hosts, in accordance with an implementation of the present subject matter.

The manner in which the described systems and methods to share multiple NICs amongst a plurality of hosts in a multi-host networking environment shall be implemented has been explained in details with respect to the FIG. 1-3. While aspects of described systems and methods can be implemented in any number of different computing systems, transmission environments, and/or configurations, the embodiments are described in the context of the following exemplary system(s).

It should be noted that the description merely illustrates the principles of the present subject matter. It will thus be appreciated that those skilled in the art will be able to devise various arrangements that, although not explicitly described herein, embody the principles of the present subject matter and are included within its scope. Moreover, all statements herein reciting principles, aspects, and embodiments of the present subject matter, as well as specific examples thereof, are intended to encompass equivalents thereof.

Devices that can implement the disclosed system(s) and method(s) include, but are not limited to, blade servers, rack servers, desktop computers, hand-held devices, multiprocessor systems, microprocessor based programmable consumer electronics, laptops, network computers, minicomputers, mainframe computers, and the like.

FIG. 1 illustrates a multi-host networking environment 100 implementing a network interface sharing system (NISS) 102, hereinafter referred to as the NISS 102, according to an implementation of the present subject matter. In said implementation, the system 100 includes host 104-1, 104-2, . . . , 104-N, collectively referred to as hosts 104 and individually referred to as host 104 hereinafter. In the multi-host networking environment, the NISS 102 interfaces the hosts 104 with external communication network, such as an external communication network 106.

Each host 104 can be understood as an independent PCIe host processor which is capable of controlling and communicating with different PCIe hardware components based on different standards issued by the Peripheral Component Interconnect Special Interest Group (PCI-SIG). A host 104 is also referred to as root complex and the terms have been used interchangeable hereinafter, for the purpose of explanation. The hosts 104 may include microprocessors, microcomputers, microcontrollers, digital signal processors, central processing units, state machines, logic circuitries, and/or any devices that manipulate signals and data based on operational instructions. In one implementation, the hosts 104 may also control and communicate with non PCI and non PCIe hardware components. Among other capabilities, the hosts 104 are individually configured to interact with the NISS 102.

In one implementation of the present subject matter, different hosts 104 may communicate with the external communication network 106 at different bandwidths, utilize different priorities for communication of data packets, and operate at different speeds of communication. Further, different hosts 104 may also be running different operating systems, such as Windows®, Android®, and Ubuntu®. The hosts may also be running more than one operating system based on a hypervisor, such as VMvare®.

The external communication network 106 may be wireless networks, wired networks, or a combination thereof. The external communication network 106 can be a combination of individual networks, interconnected with each other and functioning as a single large network, for example, the Internet or an intranet. The external communication network 106 may be any public or private network, including a local area network (LAN), a wide area network (WAN), the Internet, an intranet, a peer to peer network, and a virtual private network (VPN) and may include a variety of network devices, such as routers, bridges, servers, computing devices, storage devices, etc.

In one implementation of the present subject matter, the NISS 102 may provide a cluster of vNICs to the hosts 104 for the purpose of sharing the vNICs amongst the hosts 104. One host 104 may communicate with a set of vNIC, where the set may include one or more vNICs. Further, the NISS 102 may also form multiple such sets of vNICs such that each host 104 is associated with one set of vNICs for communicating with the external communication network 106.

In operation, the NISS 102 may form multiple sets of vNICs based requirements and needs of the hosts 104. Each set may provide functionalities required by the host 104 to communicate with the external communication network 106. The hosts 104 may be working at different speeds, priority, and offload features. Accordingly, the set of vNICs associated with each host 104 may be configured to operate based on the requirements of the host 104. In one implementation, the configuration of each set of the vNICs may be based on configuration parameters of each set, which defines the configuration of the vNICs included in each set. It would be appreciated that the set of vNICs may merely include a single vNIC which may be configured based on the requirement of the host 104 to communicate between the host 104 and the external communication network 106.

Further, the NISS 102 may also modify the configuration of each set based on dynamic requirements of the hosts 104. In one situation, based on the requirement of the hosts 104, the configuration of operation of each set of vNICs may be modified. For example, in situations where the requirement of a host 104 has reduced, the NISS 102 may modify the configuration of operation of the set of vNICs associated with the host to reduce the functionalities provided by the vNICs included in the set.

In one implementation, the NISS 102 may modify the configuration of operation and the configuration of structure, based on configuration parameters and sharing parameters associated with each set of the vNICs.

FIG. 2(a) represents the schematic representation of the NISS 102, according to an implementation of the present subject matter. FIG. 2(b) represents a schematic representation of virtual hierarchy traffic stream maintained by the NISS 102, according to an implementation of the present subject matter. For the ease of explanation, the various components, and their description, has been done together in reference to FIG. 2(a) and FIG. 2(b).

Referring to FIG. 2(a), in one implementation, the NISS 102 may communicate with 'N' different hosts 104. For the 'N' hosts 104 to communicate with the NISS 102, the hosts may be communicatively coupled with a MHIP 202 of the NISS 102. The MHIP 202 may interface upstream ports of the NISS 102 with the hosts 104. In one implementation, the interface may be provided based on MR-PCIe link where the data packets are communicated in the multi-host networking environment based on PCIe multi-root virtual hierarchy scheme.

The interface provided by the MHIP 202 may allow the hosts 104 to communicate with a programmable vNIC cluster 204. As described earlier, the programmable vNIC cluster 204 may include a plurality of vNICs which may be configured to form multiple sets of vNICs where each set of vNICs may include one or more vNICs, based on the configuration of structure identified for the coupled hosts. It would be understood that one or more vNICs, from amongst the programmable vNIC cluster 204, may not be included in any set of vNICs and may remain idle during the processing of data packets by the NISS 102. Further, in one implementation, a set of vNICs associated with a host 104 may merely include a single vNIC through which the host 104 may communicate data packets with the external communication network 106. Therefore, the MHIP 202 may facilitate the hosts 104 to communicate with their associated set of vNICs.

For example, the MHIP 202 may facilitate communication between the host 104-1 and a set of vNICs associated with the host 104-1. In such a situation, the set of vNIC associated with the host 104-1 may include vNIC0, and vNIC1. Therefore, the data packets of the host 104-1 may be routed to either of the vNIC0 or the vNIC1. Similarly, the data packets provided by either the vNIC0 or the vNIC1 for the hosts 104 may be provided to the host 104-1, by the MHIP 202.

Further, the MHIP 202 may also allow, a vNIC from amongst the vNIC cluster, to communicate with one or more hosts 104. For example, the MHIP 202 may facilitate communication between the vNIC 1 and the host 104-1 while the vNIC 1 is included in a set associated with the host 104-1. However, in situations when the vNIC 1 is re-configured to be associated with another set, say a set of vNIC associated with host 104-4, the MHIP 202 may facilitate the vNIC 0 to communicate with the host 104-4. In an implementation of the present subject matter, the re-configuration of the vNIC1, from the host 104-1 to the host 104-4, may be facilitated by components of the NISS 102 based on a pre-defined process described hereinafter in the description.

Therefore, in one implementation, the MHIP 202 facilitates communication between the hosts 104 and the vNIC cluster based on multiplexing and de-multiplexing of each virtual hierarchy traffic stream based on the configuration of structure of the programmable vNIC cluster 204. The configuration of multiple communication channels between the vNICs of the programmable vNIC cluster 204 and the hosts 104 is depicted in FIG. 2(b). Referring to FIG. 2(b), the connection between the upstream port of the hosts 104 and that of the MHIP 202 are depicted as 252, 254, and 256. The upstream ports may allow the plurality of vNICs to communicate with the hosts 104.

In one implementation, the upstream port 252 of the MHIP 202 may be coupled with the upstream port of the host 104-1, the upstream port 254 may be coupled with the host 104-4, and the upstream port 256 may be coupled with the host 104-N. Each host 104 may communicate with an associated set of vNICs. For the purpose of clarity, the communication channel between the host 104-1 and the vNICs is depicted based on solid line connections. However, the probable connections of a vNIC to different upstream ports of the MHIP 202 are depicted with dotted/hashed line connections.

In said implementation, the upstream port 252 of the MHIP 202 may connect the host 104-1 to 4 different vNICs, such as vNIC0, vNIC1, vNIC2, and vNIC3. Similarly, the other upstream ports of the MHIP 202 may connect other hosts 104 to the other vNICs but the communication channels have not been depicted in the FIG. 2(b), for the sake of clarity.

In one implementation, as described earlier, each vNIC of the programmable vNICs cluster 204 can be configured to communicate with different upstream ports of the MHIP 202. Similarly, some of the vNICs may also be configured to merely communicate dedicatedly with one host 104. For example, the vNIC0 may be configured to communicate with either the upstream port 252, or the upstream port 254, depending on the configuration of structure implemented for the programmable vNICs 204. Similarly, the vNIC 1 may merely be configured to communicate with one upstream port 252. Although, it has been described that different vNICs may configurable with different upstream ports of the MHIP 202, it would be appreciated that all the vNICs may be configurable to be connected to all the upstream ports of the MHIP 202 as well. It would be appreciated that while a host 104 may communicate with more than one vNICs at one instance, one vNIC may be configured to communicate with merely one host 104 at any given instance.

In another implementation of the present subject matter, the vNICs may also be configurable to operate at different configuration of operation. That is, each vNIC may operate a different operation configuration to provide the requisite functionality to the host 104. For example, for the scenario depicted in the FIG. 2(b) where the host 104-1 is associated with a set of vNICs that include vNIC0, vNIC1, vNIC2, and vNIC3, each of the vNIC within the set may be configured to operate at different configuration of operation. For example, the vNIC0 may be configured to operate at a speed of communication of 10 G while the vNIC1 may be configured to operate at a speed of communication of 1 G. Similarly, the vNIC2 may be configured at a speed of communication of 2.5 G and the vNIC3 may be configured at a speed of communication of 3 G. In a similar manner, different vNICs may be configured differently to communicate with the hosts 104. Although it has been described that each vNIC of the programmable vNIC cluster is configured at different configuration of operation, it would be appreciated that one or more vNICs may also be configured at with similar or same configuration of operation, based on the requisite of the hosts 104.

Referring to FIG. 2(a), in one implementation, the configuration of operation of the programmable vNIC cluster may be done by a control plane central processing unit (CPU) 206, through an interface 250. The control plane CPU 206 may configure the configuration of structure and the configuration of operation for the programmable vNIC cluster 204. In one implementation, while a new configuration of structure may be defined for a host 104, one or more vNICs may be removed from the set of vNICs associated with the host 104 and, may be associated with another host. In such a situation of re-configuration, the control plane CPU 206 may first disconnect such one or more vNICs from the host 104 and then re-connect them to the another host. It would be understood that prior to connection to another host, the vNIC may be configured in a different configuration of operation as compared with the previous configuration of operation.

As described earlier, the configuration of structure defines different sets of the vNICs which are to be associated with the hosts 104, while the configuration of operation defines the configuration with which vNICs of each set operate, such as speed, priority, and offload features, while handling data packets of corresponding hosts 104.

Therefore, the control plane CPU may configure the programmable vNIC cluster 204 with different configurations to communicate with the hosts 104. The configuration of vNICs may allow dynamic mapping capability to the NISS 102 based on which hosts 104 may be provided with vNICs and required functionalities. In one implementation, the control plane CPU 206 may also configure uplink interfaces of the MHIP 202 such that each set of vNICs is associated with their corresponding hosts 104.

In one implementation, the NISS 102 may also include an integrated enhanced L2 switch 208. The integrated enhanced L2 switch 208 may allow enhanced routing capabilities along with enhanced speed of communication. The enhanced L2 switch 208, amongst other things, interfaces the programmable vNIC cluster 204 to a cluster of MAC 210.

The cluster of MAC 210 may include one or more MAC cores which may provide connection to the NISS 102 with the external communication network 106. It would be understood that each MAC cores would provide the functionalities of a media address control to the hosts 104. The one or more MAC cores may be configured at different speeds of operation, such as 1 G, 5 G, and 10 G. For example, while all the hosts 104 wish to communicate with the external communication network 106 at a speed of communication of 5 G or less, based on the requisite functionalities, the one or more MAC cores may be configured to operate at speed of communication of less than 5 G. Similarly, in situations where the requisite of the hosts 104 is of a communication speed greater than 5 G, one or more MAC cores of the cluster of MAC 210 may be configured to operate at a speed greater than 5 G.

In one implementation, when a MAC core is configured in 10 G mode, it may interface to a reconciliation layer and a XGXS module (not shown) on the line interface of the external communication network 106. Similarly, if the MAC core is configured in 1 G mode, it may interface to a SGMII module (not shown). Further, the cluster of MAC 210 may also include different components for providing separate media access control functionalities, such as movement of data packets, performance of cyclic redundancy checks (CRC), and implementation of time counters for processing of pause packets. Such components and their functionality are well understood and the same has not been described in further detail for the same of brevity.

In one implementation, the enhanced L2 switch 208 may also interface with a memory management unit (MMU) 212, to facilitate the routing of data packets at a faster rate. For the ease of explanation, the configuration and functionalities of the enhanced L2 switch 208 along with other components of the NISS 102, have been explained in reference to FIG. 2(c).

FIG. 2(c) depicts an embodiment of the NISS 102, implementing the enhanced L2 switch 208, according to an implementation of the present subject matter. In said implementation, the NISS 102 may provide 128 upstream ports, such that 128 hosts 104 may communicate with the external communication network 106, through the NISS 102. To facilitate communication with 128 hosts 104, the enhanced L2 switch 208 may also include 128 upstream ports coupled to the programmable cluster of vNICs 204. In said implementation, the programmable vNIC cluster 204 may include up to 128 vNICs. Further, as described earlier, each of the vNICs may communicate with different hosts 104, depending on the configuration of operation, configured by the control plane CPU 206 for the programmable vNIC cluster 204. Furthermore, each vNIC of the programmable cluster of vNICs 204 may be interfaced to the enhanced L2 switch 208 for the purpose of data transfer between the hosts 104 and the external communication network 106.

To facilitate multiple port interfaces to the programmable vNIC cluster, the enhanced L2 switch 208 may branch one or more line interface of the external communication network 106 into multiple interfaces, for the vNICs of the programmable vNIC cluster to connect to. In one implementation, the enhanced L2 switch 208 may utilize integrated port switches to branch the line interface of the external communication network 106 into multiple interfaces.

In the above described scenario where the NISS 102 provides 128 ports, the enhanced L2 switch may include four 33-port switches, 270-1, 270-2, 270-3, and 270-4. For the ease of explanation, the 33-port switches, 270-1, 270-2, 270-3, and 270-4 are commonly referred to as 33-port switches 270 and individually referred to as 33-port switch 270, hereinafter. The four 33-port switches may provide at least 32 interfaces each, and total of at least 128 interfaces, which could be coupled to the programmable vNIC cluster 204. In said implementation, the enhanced L2 switch 208 may also implement a 9-port switch (not shown) for ease of implementation and reduction of bandwidth requirements of the NISS 102. It would be understood that in different implementation, where the NISS 102 may provide more than 128 ports, the number of 33-port switches integrated into the enhanced L2 switch may vary and may increase as per the functionality provided by the NISS 102. For instance, the enhanced L2-switch may include eight 17-port switches and One 13-port switch to route data packets.

In operation, as depicted in the FIG. 2(c), the enhanced L2 switch 208 interfaces the programmable vNIC cluster 204 with the line interface of the external communication network 106. In one implementation, the enhanced L2 switch 208 may provide two different modes of data packet routing. In one mode of data packet routing, the data packets may be routed between the hosts 104 and the external communication network 106. In another mode of data packet routing, the enhanced L2 switch 208 may route data packets from one host 104 to another host 104, without routing the data packets through the external communication network 106.

In one implementation, the flow of data packets between the hosts 104 and the external communication network 106 may occur according to the described enhanced routing mechanism. As described earlier, the data packets arriving from the line interface of the external communication network 106 may be checked by the one or of the MAC cores, from the cluster of MAC 210. Once the data packets are checked and the media access control functionalities have been completed, the cluster of MAC 210 may provide the data packets to the enhanced L2 switch 210. In one implementation, the data packets may be received by 9-port switch 272 of the enhanced L2 switch. The 9-port switch 272 may then parse the data packet and split the data packet into header of the data packet, and payload of the data packet. It would be understood that the header of any data packets includes routing information while the payload of the data packet includes the actual data to be delivered to a destination included in the header.

The enhanced L2 switch 208 may then route the data packet based on the enhanced routing mechanism. In one implementation of the present subject matter, while processing the data packets based on the enhanced routing mechanism, the enhanced L2 switch 208 may write the data packet payload into the MMU (212). Further, the enhanced L2 switch 208 may modify the header of the data packets to generate a new iHeader. For generation of the iHeader, the enhanced L2 switch 208 may append the original header of the data packet with memory pointer address where the payload of the data packet is stored in the MMU 212. It would be understood that the iHeader may include more details than the described memory pointer address. Further, the information included in the original header of the data packet may also be prepended instead of being amended into the header of the data packet.

Further, in said implementation, the iHeader may then be forwarded by the 9-port switch 272 of the enhanced L2 switch 208 to the various switches and routing logics where the destination of the data packet may be determined based on the information included in the iHeader. Once the destination is determined, the iHeader of the data packet may be routed to a particular communication interface which connects the enhanced L2 switch 208 to either the programmable vNIC cluster 204, or the cluster of MAC 210.

In situation where the data packet for which the iHeader is generated is received from the external communication network 106 and is being routed to one of the hosts 104, one of the 33-port switches 270-1, 270-2, 270-3, and 270-4 may receive the iHeader. In such a situation, based on the memory pointer address included in the iHeader, the 33-port switch may fetch the payload of the data packet. Thereafter, the data packet may then be re-constructed and forwarded to one of the vNICs coupled to the enhanced L2 switch 208 for delivery to the destination host 104.

In situation where the data packet for which the iHeader is generated is received from one of the hosts 104 and is to be provided to the external communication network 106, the 9-port switch 272 may analyze the line interface to which the data packet is to be transferred based on the destination information included in the iHeader. Thereafter, the data packet may then be re-constructed and forwarded to the cluster of MAC 210 for necessary checks of the media access control functionalities. Further, the data packet may then be transmitted to the external communication network 106 for delivery.

In the above described scenarios, it may occur that while the data packets received from the external communication network 106, were through a port of MAC 1, it may occur that while the data packet from the host is being provided to the external network is through another port of MAC 2.

As described earlier, the NISS 102 may also allow direct communication of data packets from one host 104 to another host 104. In one implementation, the flow of data packets between the hosts 104 may occur according to a cut-through routing mechanism. While processing the data packets based on the cut-through routing mechanism, the 9-port switch 272 of the enhanced L2 switch 208 may directly route the data packets from the ingress buffer to the egress buffer without either splitting the header of the data packet, or storing the payload onto the MMU 212. This, the cut-through routing mechanism of the data packets simplifies the bandwidth requirements in case of host to host communications.

In one implementation, the enhanced L2 switch 208 may consists of different logical blocks apart from registers, clocks and reset blocks. The logical blocks, amongst other components, may include ingress logic block (ILB), virtual output queue (VoQ), scheduler and crossbar logic (SOCL), and egress logic block (ELB) for the purpose of routing and switching data packets. These components have not been shown in the figure for the sake of brevity and ease of explanation.

In said implementation, the ILB may include of buffers to hold any incoming payload until a decision of forwarding a data packet to a defined destination is taken. The ILB may also parse different fields associated with a data packet, such as VLAN fields, address lookup, and L2, L3, and L4 headers; and extract information related to routing of the data packet.

The VoQ may implement queuing mechanisms for different switches in the enhanced L2 switch 208, such as the 33-port switches 270. The VoQ may address a challenge of Head-of-line blocking in the enhanced L2 switch 208. In one implementation, the VOQ may be divided into three categories based on configuration settings, such as VOQ CPU PORT, VOQ_LINE_PORT, and VOQ_HOST_PORT. The three different configurations may implement different number of priority classes and different number of First in First Out (FIFO) entries per priority class. In said implementation, each VOQ may be circular buffer. The circular buffer Write and Read pointers may be maintained in the VoQ block, while iHeaders are stored in MMU 212.

Further, the SOCL logic may implement mechanisms for maximizing the through-put of the enhanced L2 switch 208. The optimization of the through-put may be based on different parameters, such as tightness of the delay bounds, achievable network utilization, fairness and protection, protocol overhead, computational cost, and robustness. In one implementation, the crossbar logic of the SOCL may be implemented based on multiple stages of multiplexers. Further, the scheduler of the SOCL may consist of 2-stage arbiter per egress port of the enhanced L2 switch 208. Apart from the arbiter the scheduler of the SOCL may also include mechanism of traffic shaping and Quality of Service (QoS). A scheduler is instantiated per Egress port. The Egress ports are divided into three categories.

Further, in one implementation, the enhanced L2 switch may also include the ELB for fetching data payload from the MMU 112 and provide it to either transmit logic of the cluster of MAC 210 or receive logic of host 104.

In one implementation of the present subject matter, the enhanced L2 switch 208 may also implement a common set of offload engines such as an IP header checksum, transmission control protocol (TCP) header checksum, receive side scaling (RSS), and TCP segmentation offload. These engines may be implemented individually for each of the line interface which may saving of area of the NISS 102 and, the power consumption of the NISS 102.

Therefore, the enhanced L2 switch 208 may perform the routing and switching of the data packets based on the enhanced routing mechanism and the cut-through routing mechanism. The manner of data packet routing in a switch based on ingress and egress buffers are well known and therefore, the details of the same have been omitted for the sake of brevity.

FIG. 3(*a*) illustrates a method 300 for sharing NICs amongst a plurality of hosts, in accordance with an implementation of the present subject matter. FIG. 3(*b*) illustrates a method 350 for routing of data packets in a network interface sharing system, in accordance with an implementation of the present subject matter. The order in which the methods are described is not intended to be construed as a limitation, and any number of the described method blocks can be combined in any order to implement the methods, or any alternative methods. Additionally, individual blocks may be deleted from the methods without departing from the spirit and scope of the subject matter described herein. Furthermore, the methods can be implemented in any suitable hardware, software, firmware, or combination thereof.

A person skilled in the art will readily recognize that steps of the methods can be performed by programmed computers. Herein, some embodiments are also intended to cover program storage devices, for example, digital data storage media, which are machine or computer readable and encode machine-executable or computer-executable programs of instructions, wherein said instructions perform some or all of the steps of the described methods. The program storage devices may be, for example, digital memories, magnetic storage media such as a magnetic disks and magnetic tapes, hard drives, or optically readable digital data storage media.

In one implementation of the present subject matter, a control plane CPU 206 of a network interface sharing system (NISS) 102 may implement the steps of the method 300. Referring to method 300, at block 302, a host to share a plurality of virtual network interface controllers (vNICs) of a programmable vNIC cluster is identified. The host may be a host 104-1 from amongst the plurality of hosts 104 which are provided connectivity by NISS 102. In one implementation, the NISS 102 may include a programmable vNIC cluster which may include one or more vNICs which may be utilized by the hosts 104 to access the external communication network 106.

At block 304, functional requirements associated with the host 104-1 are determined. In one implementation, the host 104-1 identified from amongst the plurality of hosts 104 may have specific functional requirements for communicating data packets with the external communication network 106. The functional requirements may include, but are not limited to, specific bandwidth for communication, utilization of defined priorities for the data packets, and operating at required speed of communication.

For example, in one implementation of the present subject matter, the host 104-1 may require communication of data packets to be done at a communication speed of 8 G. In such a situation, the specific functional requirement of the host 104-1 is determined to be communication at 8 G. Further, in other implementations, the host 104-1 may also include more functional requirements, such as requirement of a minimum bandwidth of 2 Gbps and priority routing of all data packets.

At block 306, a configuration of structure and a configuration of operation is identified based on the functional requirements associated with the host 104-1. In one implementation, the configuration of structure defines the number of vNICs to be associated with the host 104-1 to fulfill the functional requirements of the host 104-1. Further, the configuration of the operation may define the configuration of working of each of the vNIC to be associated with the host. For example, if the functional requirement of the host 104-1 is to operate at a communication speed of 8 G, a configuration of structure may define 3 vNICs to be associated with the host 104-1. Further, configuration of operation may also be identified where based on the functional requirements, the vNICs associated with the hosts are identified to operate at a speed of 8 G.

At Block 308, a set of vNICs is generated from amongst the plurality of vNICs, based on the configuration of structure. In one implementation, the vNICs which are to be included in the set of vNICs may be determined based on availability of the vNICs in the programmable vNIC cluster 204. For example, it may be determined from the configuration of structure that 3 different vNICs are to be associated with the host 104. In such a situation, the 3 different vNICs to be associated with the host 104 may be determined based on identification of 3 different vNICs of the programmable vNIC cluster 204 which are available. In some situation, one or more vNICs that have not been assigned to any of the hosts 104 may be utilized. In other situation, vNICs which are ideal and currently are not being used may be identified to be provided to the host 104-1.

At block 310, the set of vNICs identified to be associated with the host 104-1 are dynamically configured to operate based on the configuration of operation. In one implementation, the configuration based on which each of the vNICs in the set of vNIC associated with the host 104-1 are operating may be dynamically modified to suit the configuration of operation. Further, different vNICs in a set may also be configured with different operational configuration to meet the configuration of operation for the set of vNICs.

Figure 3B:
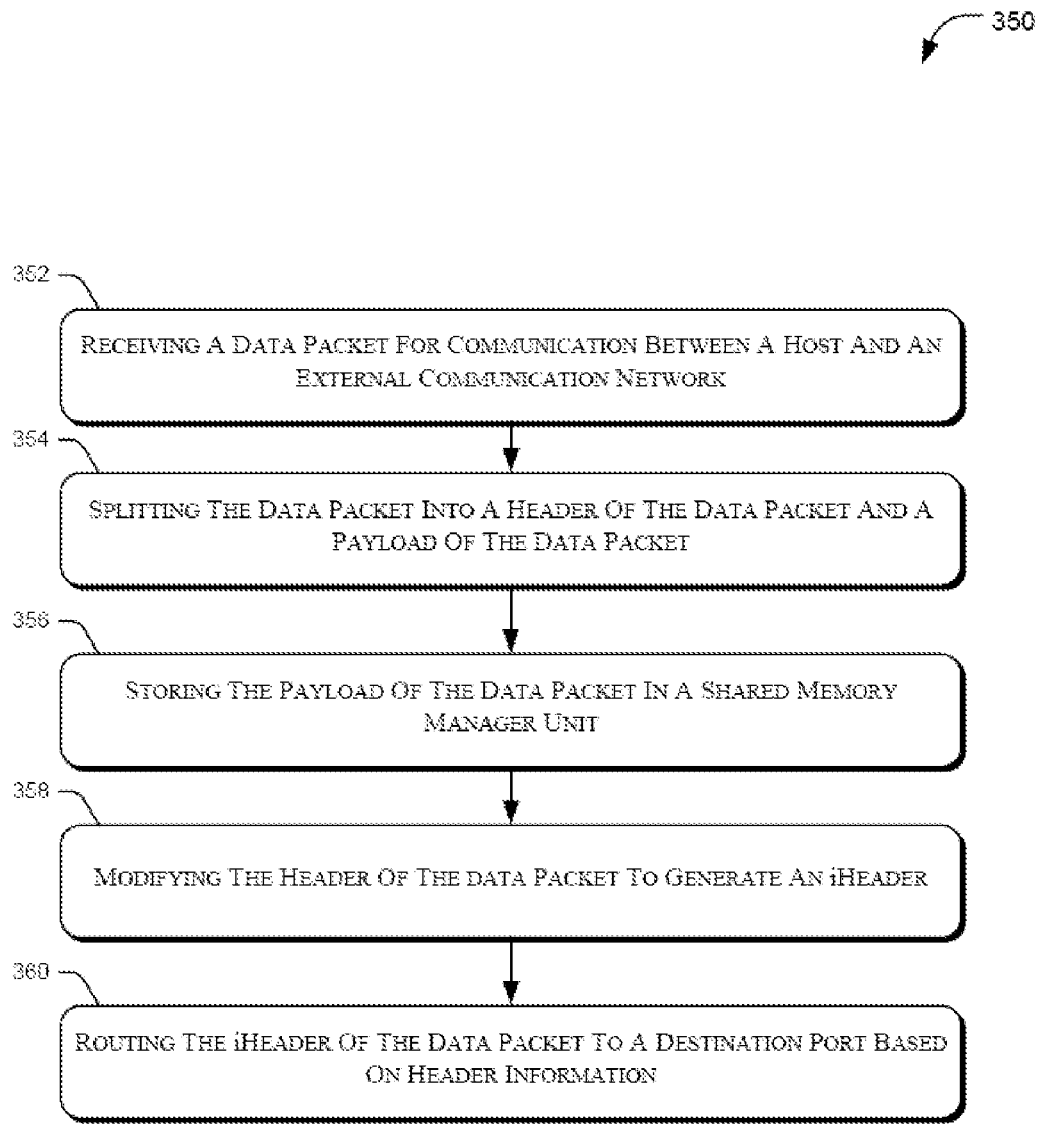
FIG. 3(b) illustrates a method of routing data packets in the NISS, in accordance with an implementation of the present subject matter.

Referring to FIG. 3(b), at block 352, a data packet for communication between a host and an external communication network is received. In one implementation, the data packet may be received from the external communication network and may have to be routed to a host 104. In another implementation, the data packet may be received from one of the host 104 and may have to be routed to the external communication network 106.

At block 354, the data packet is split into a header of the data packet and a payload of the data packet. It would be understood that the header of the data packet includes the routing information based on which the data packet is routed. Further, the header of the data packet may also include other information, such as amount of payload, priority of the data packet, etc. Furthermore, the payload may include the actual data which is to be delivered to the destination included in the header.

At block 356, the payload of the data packet is stored in a shared memory unit. In one implementation, the payload of the data packet may include data to be delivered to one of the hosts 104.

At block 358, the header of the data packet is modified to generate an iHeader. In one implementation, the iHeader may be generated by appending the information of storage of the payload of the data packet in the header of the data packet. For example, the location in the shared memory unit where the payload of the data packet is stored may be included in the header of the data packet to generate the new iHeader.

At block 360, the iHeader may be routed based on the destination while the payload of the data packet is stored in the shared memory unit. In one implementation, while the iHeader reaches the destination port, from where the data packet may be forwarded to the host, the payload may be retrieved from the shared memory unit. Further, the payload of the data packet and the header of the data packet may be combined together to regenerate the data packet.

It would be understood that the final data packet which may be delivered to the destination may receive the data packet as unaltered and the iHeader generated is for the purpose of routing merely the header while the payload is stored in the shared memory unit. This allows for efficient and fast routing of data packets by the NISS 102.

Although implementations for sharing NICs amongst a plurality of hosts have been described in language specific to structural features and/or methods, it is to be understood that the appended claims are not necessarily limited to the specific features or methods described. Rather, the specific features and methods are disclosed as exemplary implementations for sharing of NICs amongst the plurality of hosts.

What is claimed is:

1. A Network Interface Sharing System (NISS) to share a plurality of virtual network interface controllers (vNICs) amongst a plurality of hosts the NISS comprising:
 a programmable vNIC cluster comprising the plurality of vNICs, wherein a set of vNICs from amongst the plurality of vNICs is dynamically configured to communicate with a host from amongst the plurality of hosts based on functional requisites of the hosts and each vNIC from amongst the set of vNICs enables data transfer between the host and an external communication network;
 an enhanced layer 2 (L2) switch to route the data packets between the programmable vNIC cluster and a media access control (MAC) cluster, wherein the MAC cluster connects the NISS to one or more external communication network;
 a multi-host peripheral component interconnect (PCI) express (PCIe) interface and mapper (MHIP) coupled to the programmable vNIC cluster, to:
  receive data packets from the set of vNICs, wherein the set of vNICs comprises one or more vNICs; and
  provide the data packets from the set of vNICs to the host based on demultiplexing of the data packets, wherein the MHIP enables communication between the plurality of vNICs and the plurality of hosts.

2. The NISS as claimed in claim 1 further comprising a control plane central processing unit (CPU) to
 dynamically configure the set of vNICs for communication with the host based on a configuration of structure, wherein the configuration of structure is based on the functional requisites of the hosts.

3. The NISS as claimed in claim 1, wherein the MHIP further is to:
 receive data packets from the host;
 provide the data packets from the host to the set of vNICs based on multiplexing of the data packets.

4. The NISS as claimed in claim 1, wherein the MHIP further
 provides the data packets from the other host to the host based on a cut-through routing mechanism, wherein the cut-through mechanism allows direct routing of data packets between any two hosts from amongst the plurality of hosts.

5. The NISS as claimed in claim 1, wherein the NISS further comprises a shared memory manager unit coupled to a L2 switch to store data packets communicated between the hosts and the external communication network.

6. The NISS as claimed in claim 1, wherein the enhanced L2 switch comprises at least one integrated port switch to provide switching and routing mechanism to data packets between the MAC cluster and the programmable vNIC cluster.

7. The NISS as claimed in claim 1 further comprising a MAC cluster to connect the NISS to one or more external communication networks, wherein the MAC cluster comprises one or more MACs, and wherein the one or more MACs are configurable to transfer the data packets at different data rates.

8. The NISS as claimed in claim 2, wherein the control plane CPU dynamically configures the set of vNICs to operate based on configuration of operation, wherein the configuration of operation is based on functional requisites of the hosts.

9. The NISS as claimed in claim 2, wherein the configuration of operation includes at least one of bandwidth of communication, priority for data packets, and speed of communication.

10. The NISS as claimed in claim 2, wherein the control plane CPU dynamically re-configures one or more vNICs from the set of vNICs into another set of vNICs for communication with another host.

11. The NISS as claimed in claim 2, wherein the control plane CPU dynamically re-configures at least one vNIC from amongst the plurality of vNICs of the programmable vNIC cluster to be included in the set of vNICs.

12. A method to share a plurality of virtual network interface controllers (vNICs) amongst a plurality of hosts, the method comprising:
 identifying, by a Network Interface Sharing System (NISS), a host to share a plurality of vNICs of a programmable vNIC cluster;
 determining, by the NISS, a functional requisite associated with the host, wherein the functional requisite is indicative of functionalities provided by the host;
 identifying, by the NISS, at least one of configuration of structure and a configuration of operation associated with the host, based on the functional requisite; and
 generating, by the NISS, a set of vNICs from amongst the plurality of vNICs based on the configuration of structure associated with the host, wherein the set of vNICs is configured to communicate with the host, wherein data packets for communication with the host are routed between the set of vNICs and a media access control (MAC) cluster by an enhanced layer 2 (L2) switch integrated within the NISS, and wherein the MAC cluster connects the NISS to one or more external communication network.

13. The method as claimed in claim 12 comprising dynamically configuring the vNICs of the set of vNICs based on the configuration of operation, wherein the configuration of operation is indicative of operational constraints of the set of vNICs.

14. The method as claimed in claim 12, wherein the method comprises configuring a MHIP to multiplex data packets received from the host among the set of vNICs.

15. The method as claimed in claim 14, wherein the method comprises configuring the MHIP to de-multiplex data packets received from an external communication network to the host.

16. The method as claimed in claim 12 further comprising:
 determining a new functional requisite associated with the host;
 identifying at least one of a new configuration of structure and a new configuration of operation associated with the host, based on the new functional requisite; and
 generating another set of vNICs from amongst the plurality of vNICs based on the new configuration of structure associated with the host, wherein the another set of vNICs is configured to communicate with the host.

17. The method as claimed in claim 13, wherein the configuration of operation includes at least one of bandwidth of communication, priority for data packets, and speed of communication.

18. A method for routing data packets in a Network Interface Sharing System (NISS), the method comprising:

receiving, by an enhanced Layer 2 (L2) switch of the NISS, a data packet for communication between a host from amongst a plurality of hosts and an external communication network;

splitting, by the enhanced L2 switch, the data packet into a header of the data packet and a payload of the data packet, wherein the header of the data packets includes at least a destination of the data packet;

storing, by the enhanced L2 switch, the payload of the data packet in a shared memory manager unit (MMU), wherein the payload of the data packet includes information to be delivered to the destination;

modifying, by the enhanced L2 switch, the header of the data packet to generate an iHeader, wherein the iHeader includes information of storage of the payload of the data packet in the shared MMU; and routing, by the enhanced L2 switch, the iHeader of the data packet to a destination port based on destination information included in the iHeader to at least one of a set of vNICs and a cluster of media access control (MAC), wherein the set of vNICs is dynamically configured to communicate with the host based on functional requisites of the host and the MAC cluster connects the NISS to one or more external communication networks.

19. The method as claimed in claim 18 comprising:

retrieving the payload of the data packet from the MMU based on the information included in the iHeader; and re-constructing the data packet based on the payload of the data packet and the iHeader of the data packet.

20. The method as claimed in claim 19, wherein the method comprises delivering the data packet at the destination, wherein the destination is a host, and wherein the data packet is de-multiplexed by a MHIP for delivery to the host.

21. The method as claimed in claim 19, wherein the routing is performed by an enhanced L2 switch based on at least one of an enhanced routing mechanism and a cut-through routing mechanism.

* * * * *